United States Patent [19]

Bittscheidt et al.

[11] Patent Number: 4,891,406
[45] Date of Patent: * Jan. 2, 1990

[54] HIGH IMPACT STRENGTH MOLDING COMPOSITIONS BASED ON POLYALKYLENE TEREPHTHALATES

[75] Inventors: Josef Bittscheidt, Marl; Gernot Horlbeck, Haltern; Salih Mumcu, Marl, all of Fed. Rep. of Germany

[73] Assignee: Huels Aktiengesellschaft, Marl, Fed. Rep. of Germany

[*] Notice: The portion of the term of this patent subsequent to Jun. 4, 2002 has been disclaimed.

[21] Appl. No.: 71,597

[22] Filed: Jul. 9, 1987

Related U.S. Application Data

[63] Continuation of Ser. No. 912,202, Sep. 25, 1986, abandoned, which is a continuation of Ser. No. 638,798, Aug. 8, 1984, abandoned.

[30] Foreign Application Priority Data

| Aug. 8, 1983 | [DE] | Fed. Rep. of Germany | ....... 3328565 |
| Aug. 8, 1983 | [DE] | Fed. Rep. of Germany | ....... 3328566 |
| Aug. 8, 1983 | [DE] | Fed. Rep. of Germany | ....... 3328567 |
| Aug. 8, 1983 | [DE] | Fed. Rep. of Germany | ....... 3328568 |

[51] Int. Cl.$^4$ .............................................. C08L 67/02
[52] U.S. Cl. ........................................ 525/64; 525/176; 525/177; 525/425
[58] Field of Search .................. 525/425, 176, 177, 64

[56] References Cited

U.S. PATENT DOCUMENTS

| 3,578,729 | 5/1971 | Brinkmann | .......................... 525/176 |
| 3,580,965 | 5/1971 | Brinkmann | .......................... 525/176 |
| 4,022,748 | 5/1977 | Schlichting | ......................... 525/64 |
| 4,025,492 | 5/1977 | Binsack et al. | . |
| 4,096,202 | 6/1978 | Farnham | ............................ 523/201 |
| 4,309,518 | 1/1982 | Horlbeck | ............................. 525/408 |
| 4,360,661 | 11/1982 | Horlbeck | ............................. 528/490 |
| 4,369,280 | 1/1983 | Dieck | ................................. 524/281 |
| 4,387,213 | 6/1983 | Horlbeck | ............................. 525/437 |
| 4,434,276 | 2/1984 | Horlbeck | ............................. 525/437 |
| 4,521,554 | 6/1985 | Droscher | ............................. 523/522 |

*Primary Examiner*—Patricia Short
*Attorney, Agent, or Firm*—Millen, White & Zelano

[57] ABSTRACT

The production of high impact strength molding compositions obtained by thermal treatment of synthetic resin mixtures containing predominantly polyalkylene terephthalate, in the solid form, characterized in that the synthetic resin mixture contains A. 70–95% or 60–97% by weight of polyalkylene terephthalate and B. when A is 70–95%, 5–30% by weight of a conventional, elasticizing acrylate graft copolymer, a conventional α-olefin copolymer or a conventional polyether amide, or when A is 60–97%, 3–40% of a conventional polyether ester amide, and that the synthetic resin mixture is treated at temperatures of 15°–60° C. below the melting point of the pure component A in an inert gas atmosphere.

45 Claims, No Drawings

HIGH IMPACT STRENGTH MOLDING COMPOSITIONS BASED ON POLYALKYLENE TEREPHTHALATES

This application is a continuation of application Ser. No. 912,202, filed 9/25/86, which is a continuation of Ser. No. 638,798, filed 08/08/84, now both abandoned.

CROSS-REFERENCE TO RELATED APPLICATION

Improvements in the cold impact strength of polybutylene terephthalate are set forth in Assignee's copending application Ser. No. 582,645, filed Feb. 22, 1984 by Droscher et al, entitled "Polybutylene Terephthalate Molding Compositions with High Cold Impact Strength and Amenable to Thermoplastic Processing", now U.S. Pat. No. 4,521,554.

BACKGROUND OF THE INVENTION

This invention relates to the production of high impact strength molding compositions obtained by thermal treatment of synthetic resin mixtures containing predominantly polyalkylene terephthalate, in the solid form, as well as to the thus-obtained molding compositions as such.

Polyalkylene terephthalates are valuable building materials having a number of excellent properties, such as high rigidity, surface hardness, abrasion resistance, a relatively high deflection temperature under load, dimensional stability, and rapid processability to complicated and large-size molded articles.

Conversely, the impact strength of the polyalkylene terephthalates is inadequate for some applications, especially at temperatures of below 20° C., so that there is a need to develop polyalkylene terephthalate molding compositions having higher impact strengths. By "impact strength" in connection with this invention is meant that measured by using a notched bar as is conventional in the plastics industry. In the United States, a conventional procedure is the Izod test (ASTM D256) and in the Federal Republic of Germany DIN 53 453.

Numerous suggestions have been advanced for improving the low temperature impact strength of polyalkylene terephthalate molding compositions by the incorporation of aliphatic dicarboxylic acids or diol mixtures by condensation, or by blending with other polymers, such as modified elastomers and polyolefins. However, all of these measures have the drawback that either the increase in low temperature impact strength is only minor or that a marked improvement in low temperature impact strength is accompanied by an undesirable impairment of other properties, especially rigidity and deflection temperature under load.

One group of elastomers proposed for modifying the impact strength of polyalkylene terephthalates comprises alkyl acrylate multistage graft copolymers. Thus, U.S. Pat. No. 4,034,013 and DOS No. 2,726,256 describe the use of multistage graft copolymers of an elastomeric basic polymer and a graft component. The basic polymers are preferably derived from butyl acrylate while methacrylates, preferably methyl methacrylates, are utilized as the graft component.

DOS No. 3,012,333 describes impact resistant compositions of polyalkylene terephthalates and polyacrylate graft copolymers; the blends can be additionally reinforced by glass fibers and/or can be made flame-retardant.

Impact resistant injection molding compositions of polyalkylene terephthalates, acrylate multistage graft copolymers, polyether ester elastomers, and specific stabilizer combinations are described in European Pat. Nos. 33,393 and 32,586.

However, impact strength improving effect of the polyacrylate additives in the blends with polyalkylene terephthalates is unsatisfactory insofar as high proportions of modifier are required to obtain a relatively minor increase in the impact strength. Due to the high elastomer proportion, rigidity and deflection temperature under load of the polyester molding compositions are markedly impaired.

Likewise, with respect to another group of modifiers, DOS No. 2,930,343 describes molding compositions based on polyalkylene terephthalate with contain blended-in polyether ester amides, in order to improve impact strength, but here again, such relatively high proportions of the polyether ester amide must be incorporated into the polyalkylene terephthalate to achieve an increased impact strength, that rigidity and deflection temperature under load of the polyester are clearly impaired.

In still another group of modifiers, copolymers of α-olefins, the same problem exists. For details, in DOS No. 1,694,168, there is described the use of 0.05–20% by weight—based on the total mixture—of copolymers of α-olefins and vinyl esters of saturated aliphatic monocarboxylic acids for the modification of polyethylene terephthalate molding compositions. DOS's Nos. 2,756,698 and 3,040,999 and U.S. Pat. No. 4,101,502 claim reinforced polyalkylene terephthalate molding compositions blended with ethylene/vinyl acetate copolymers to improve toughness, and impact-resistant molding compositions of polyethylene terephthalate and/or polybutylene terephthalate and copolymers of α-olefins and esters of acrylic acid are described, for example, in DOS's Nos. 1,694,170 and 2,248,242.

SUMMARY

An object of this invention, therefore, is to provide polyalkylene terephthalate of improved impact strengths while substantially avoiding the disadvantages described above.

Another object is to provide a process for obtaining such improved polyalkylene terephthalates.

Upon further study of the specification and appended claims, further objects and advantages of this invention will become apparent to those skilled in the art.

To attain these objects, improved polyalkylene terephthalates are produced by heating an intimate polymeric mixture of a predominant amount of polyalkylene terephthalate and a minor amount of particular modifiers of this invention capable of increasing impact strength, to a temperature of 15°–60° C. below the melting point of the pure polyalkylene terephthalate. The melting point (Tm) is the melt maximum of the polyester determined by differential scanning calorimetry (DSC) (heating rate: 16° C./minute).

The thermal treatment of the polymeric mixture is conducted in an inert gas atmosphere, e.g., nitrogen for a sufficient time so as to effect recondensation of the polyalkylene terephthalate. Recondensation of pure polyalkylene terephthalates in this manner is a known process for increasing the viscosity number of the polymer. However, this step, in the absence of modifiers of this invention has very little effect on impact strength. Furthermore, if a recondensed polyalkylene terephthalate is thereafter intimately mixed with a modifier of this invention, all other conditions being equal, the net result is that much lower impact strengths are obtained. Accordingly, the order of steps is critical to the present invention—forming the intimate polymeric mixture before performing the recondensation step.

For further details of recondensation processes, see U.S. Pat. No. 4,434,276 and references cited therein, all incorporated by reference herein.

With respect to assignee's cross referenced copending application, Ser. No. 582,645, filed Feb. 22, 1984, it is seen that on the one hand this application relates to new impact strength modifiers, and on the other hand it states that it is preferred to employ a thermal after-treatment of a mixture of polybutylene terephthalate with a relatively small amount of the novel modifier to obtain increased impact strengths. There was no way of predicting, however, that the thermal after-treatment used in the cross referenced application would also lead to improved impact strengths when employed with mixtures based on the known impact strength modifiers of this invention especially in view of the chemical dissimilarities between the impact strength modifiers of this invention and that of the cross referenced application. Accordingly, the discovery that a thermal after-treatment of the mixtures of this invention leads to highly improved impact strength material is unexpected.

The particular mixtures of this invention are:
A. 70–95% by weight of polyalkylene terephthalate and
B. 5–30% by weight of a conventional, elasticizing acrylate graft copolymer, conventional α-olefin copolymer or conventional polyether amide. In the alternative, component B can be 3–40% by weight of a conventional polyether ester amide, and component A in this case would constitute 60–97% of the mixture.

COMPONENT A

Suitable polyalkylene terephthalates for component A are polyethylene terephthalate, polypropylene terephthalate, and preferably polybutylene terephthalate.

Up to 20 molar percent, preferably 5–15 mol-% of the terephthalic acid in the polyalkylene terephthalate can be replaced by aliphatic, cycloaliphatic, or aromatic dicarboxylic acids. Examples for suitable dicarboxylic acids are isophthalic acid, phthalic acid, cyclohexane-1,4-dicarboxylic acid, adipic acid, sebacic acid, azelaic acid, decanedicarboxylic acid, or similar compounds.

Up to 20 mol-%, preferably 5–5 mol-% of the respective alkanediol in the polyalkylene terephthalate can be substituted by other diols, such as, for example, ethylene glycol, 1,3-propanediol, 1,6-hexanediol, neopentyl glycol, 1,4-dimethylolcyclohexane, 1,12-dodecanediol, or similar compounds.

The polyalkylene terephthalate utilized according to this invention is produced in the usual way by transesterification or esterification and subsequent polycondensation of terephthalic acid or its polyester-forming derivatives, as well as the corresponding alkanediol in the presence of catalysts (Sorensen and Campbell, Preparative Methods of Polymer Chemistry, Interscience Publishers, Inc., N.Y., 1961, pp. 111-127; "Kunststoff-Handbuch" [Plastics Manual], Vol. VIII, C. Hanser Publishers, Munich, 1973; and Journal of Polymer Science, part A 1, 4 : 1851-1859, 1966).

The polyalkylene terephthalate used according to this invention has a viscosity number (J) of about 55–100 cc/g, preferably 65–95 cc/g.

COMPONENT B

Acrylate Graft Copolymers

When component B is a conventional acrylate graft copolymer having an elasticizing effect with respect to component A, the base polymer used in this connection is an elastomeric polyalkyl acrylate wherein the alkyl group is to be of 1–6 carbon atoms. A preferred monomer is butyl acrylate in order to form a polymer having a maximally low glass transition temperature.

The base polymer contains about 0.1–5% by weight of a crosslinking monomer. Suitable compounds are, for example, multiple esters of acrylic and/or methacrylic acid and polyols; preferably butylene diacrylate is employed.

Furthermore, the base polymer contains grafting aids in an amount of about 0.1–5% by weight. These involve allyl esters of unsaturated acids, such as allyl acrylate or methacrylate, respectively, or diallyl maleate. Especially suitable are the methyl esters. Preferred grafting aids are allyl methacrylate and diallyl maleate.

The base polymer represents 50–95% by weight, preferably 60–90% by weight of the total polymer of component B.

Additional monomers are graft-copolymerized onto this base polymer. A characterizing feature for these monomers is that they would result, when polymerized by themselves, in thermoplastic products. These monomers can be incorporated by polymerization in several individual steps. However, it is preferred to add these monomers by polymerization in a single step.

Preferred monomers employed are styrene, acrylonitrile, and alkyl methacrylates of 1–6 carbon atoms in the alkyl residue.

The acrylate graft copolymers described broadly herein are disclosed in detail in DOS No. 2,726,256, incorporated by reference herein.

Thus, a graft copolymer that is preferred according to this invention is formed from 60–90% by weight of butyl acrylate, 0.1–2.5% by weight of butylene diacrylate, 0.1–2.5% by weight of alkyl methacrylate, and the remainder up to one hundred is methyl methacrylate.

The disclosed acrylate graft copolymers constitute a proportion of the synthetic resin mixture of up to 5–30% by weight, preferably 10–25% by weight. The remainder is made up by the polyalkylene terephthalate of component A.

Alpha Olefin Copolymers

The component B can also be α-olefin copolymer having an elasticizing effect with respect to component A. α-Olefins along the lines of this invention are preferably ethylene, propene, or butene-1. Ethylene is especially preferred.

Suitable comonomers of the α-olefin are, on the one hand, vinyl esters, on the other hand, methacrylic acid esters and acrylic acid esters.

Vinyl acetate or vinyl propionate is primarily utilized as the vinyl ester.

Methacrylic and acrylic acid esters according to this invention are esters of methacrylic acid and aliphatic alcohols of 1–18 carbon atoms in the carbon chain. The acrylic acid butyl ester is preferred.

Especially preferred copolymers on the basis of an α-olefin/vinyl ester copolymer are those of ethylene and vinyl acetate with ethylene contents of 30–90% by weight, preferably 45–80% by weight, based on the copolymer, and with a weight average molecular weight ($\overline{M}_w$) of 10,000–500,000, preferably 50,000–300,000. The molecular weight ($\overline{M}_w$) is determined by viscosimeter.

These copolymers are prepared according to conventional methods.

Especially preferred copolymers on α-olefin/(meth)acrylic acid ester basis are those of ethylene and (meth)acrylic acid butyl ester (butyl acrylate) with ethylene contents of between 40 and 98% by weight, preferably 55–95% by weight, based on the copolymer, and with an average molecular weight ($\overline{M}_w$) of 20,000–250,000, preferably 50,000–150,000. The molecular weight ($\overline{M}_w$) is determined by viscosimeter.

These copolymers are produced according to known processes, e.g., according to the prior art supra.

Polyether Ester Amides

The polyether ester amides of component B are obtained by condensation of
1. one or several polyamide-forming compounds of the group of the ω-aminocarboxylic acids and/or lactams of at least 10 carbon atoms,
2. a polyalkylene glycol having a molecular weight in a range from 400 to 6,000,
3. one or several further, aliphatic, cycloaliphatic, or aromatic dicarboxylic acids.

ω-Aminocarboxylic acids and/or lactams of at least 10 carbon atoms, preferably laurolatcam, ω-aminododecanoic acid, or ω-aminoundecanoic acid are utilized as the polyamide-forming compound (B.1). Another preferred possibility resides in using, instead of the monomolecular aminocarboxylic acids, polymers thereof having an average molecular weight of 500–20,000, preferably 4,000–10,000.

The indicated values for the average molecular weights are derived by determining the viscosity number.

Polyalkylene glycols of component B.2 are polyethylene glycol, polypropylene glycol, or polytetrahydrofurandiol having respectively a number average molecular weight in the range from 400 to 6,000, preferably 500–2,500. The use of polytetrahydrofurandiol having an average molecular weight of 500–2,500 ($\overline{M}_n$; determined by end group titration) is preferred.

Component B.3 is constituted by aliphatic, cyclo-aliphatic, or aromatic dicarboxylic acids of 4–11 carbon atoms in the carbon skeleton. Examples are adipic acid, pimelic acid, suberic acid, azelaic acid, sebacic acid, dodecanedioic acid, hexahydroterephthalic acid, or the phthalic acids. Terephthalic acid and dodecanedioic acid are preferably used for this component.

The polyether ester amides are structured in such a way that the weight ratio of components B.1 and (B.2+B.3) is in a range of 20:80 up to 50:50. A weight ratio in the range from 25–45:75–55 is preferred. The hydroxy and carboxy groups of (B.2+B.3) are present in approximately equivalent proportions, i.e. in a ratio of 1:0.95 to 1:1.05.

Preferred polyether ester amides are produced by reacting laurolactam, polytetrahydrofurandiol having a number average molecular weight of 650–2,000, and dodecanedioic acid. The number average molecular weight of these products is in the range from 5,000 to 20,000, preferably 8,000 to 15,000.

The preparation of such polyether ester amides can be derived, for example, from DOS's Nos. 2,712,987 and 2,930,343, respectively.

Polyether Amides

The polyether amides of component B are obtained by condensation of
1. one or several polyamide-forming compounds of the group of the ω-aminocarboxylic acids and/or lactams of at least 10 carbon atoms,
2. a diamine with a polyether block, which latter contains preferably 6–30 ether oxygen atoms separated from each other by a linear, aliphatic chain of preferably 3–4 carbon atoms,
3. one or several other, aliphatic, cycloaliphatic, or aromatic dicarboxylic acids.

ω-Aminocarboxylic acids and/or lactams of at least 10 carbon atoms, preferably laurolactam, ω-aminododecanoic acid, or ω-aminoundecanoic acid are utilized as the polyamide-forming compound (B.1). Another preferred possibility resides in using, instead of the monomolecular aminocarboxylic acids and/or lactams, the polymers or copolymers thereof having an average molecular weight of 500–20,000, preferably 4,000–15,000.

The indicated values for the number average molecular weights ($\overline{M}_n$) are derived by determining the end group concentrations (amine and acid numbers).

Diamines of component B.2 are derived from ethylene oxide, propylene oxide, and tetrahydrofuran. The polyethers can be homo- and/or copolymers. Also mixtures of homo-and/or copolymers can be used. Their number-average molecular weights range between 160 and 3,000, preferably between 300 and 2,200, especially between 500 and 1,200. The use of polytetrahydrofuran with amino end groups (for example bis[3-aminopropyl]polytetrahydrofuran) is preferred.

The polyalkylene oxides with amino end groups can be produced according to conventional processes, for example in accordance with DOS's Nos. 1,570,542; 2,412,056; 2,412,057; and U.S. Pat. No. 2,401,607.

The indicated molecular weights can be determined by titration of the amino groups.

Component B.3 is constituted by aliphatic, cycloaliphatic, or aromatic dicarboxylic acids of 4–12 carbon atoms in the carbon skeleton. Examples are adipic acid, pimelic acid, suberic acid, azelaic acid, sebacic acid, dodecanedioic acid, hexahydroterephthalic acid or the phthalic acids. Terephthalic acid and dodecanedioic acid are preferably used for this component.

The polyether amides are structured in such a way that they exhibit, in the polymer chain, homo-or copolyamide segments, respectively, and polyether or polyether amide segments, respectively. The weight ratio of components B.1 and (B.2+B.3) ranges from 20:80 to 50:50. A weight ratio in the range from 25–45:-75–55 is preferred. The amine and carboxy groups of (B.2+B.3) are present in approximately equivalent proportions, i.e. in a ratio of 1:0.95 to 1:1.05.

The are produced, for example, by melting the components together and by subsequently performed polycondensation. With the use of lactams, the lactam rings must be cleaved prior to polycondensation—preferably in the presence of the dicarboxylic acid.

Preferred polyether amides are prepared by reaction of ω-aminoundecanoic acid and/or ω-aminododecanoic acid or laurolactam, dodecanedioic acid and/or terephthalic acid and bis [3-aminopropyl]polytetrahydrofuran of a molecular weight of 500–1,200.

The viscosity number (J) of these products ranges from 140 to 260, preferably 160–210 cc/g.

The production of such polyether amides can be derived, for example, from German Pat. No. 2,932,234, DOS No. 2,936,976, and European Pat. No. 25 828.

In order to conduct the thermal treatment of the synthetic resin mixtures, components A and B are blended. To avoid the segregation phenomena during further processing, the mixture is preferably melted, homogenized, and then brought into the final processing shape, such as, for example, pellets, granules, powders, etc. This working step is preferably executed in an extruder at temperatures of about 260°–280° C. However, any other conventional process usable for the aforementioned purpose can likewise be utilized.

The thus-prepared synthetic resin mixture is thermally treated in an inert gas atmosphere and preferably with agitation of the synthetic resin mixture for about 2–12 hours, preferably 4–10 hours, at a temperature of 15–60, preferably 20–50 centigrade degrees below the melting point of the respective pure component A. The process can be conducted under atmospheric pressure as well as in a slight vacuum. The treatment can be performed, for example, in a tumbler dryer or in a fluidized bed reactor.

Nitrogen is especially suitable as the inert gas. However, other inert gases can likewise be employed. It proved to be advantageous to operate in a slight stream of inert-gas.

Customary additives and auxiliary agents, such as pigments, processing aids, fillers and reinforcements, hydrolysis, thermal, or UV stabilizers, can be incorporated during production, i.e. in the melt mixture as well as into the finished, treated molding compositions.

This invention is distinguished over the state of the art in that (a) polyalkylene terephthalate molding compositions can be made of notched impact strength grade even with substantially lower additions of the conventional impact strength modifiers of component B, and thus exhibit high rigidity and deflection temperature under load, besides a good impact strength level, and (b) polyalkylene terephthalate molding compositions modified with high proportions of component B, heretofore required for obtaining an only moderate notched impact strength improvement, now exhibit an excellent notched impact strength, especially at a relatively low temperature.

The result achieved by this invention is furthermore unexpected as well, because blending a polyester subjected to solid-phase recondensation with component B does not yield any noteworthy effect—a marked effect is achieved only if the synthetic resin mixture proper is subjected to the conditions according to this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The parameters indicated in the specification and examples were determined by means of the measuring methods set forth below:

The viscosity number (J) of the polyalkylene terephthalate as well as of the molding compositions with component B was determined with the use of solutions of 0.23 g of polyester in 100 ml of phenol/sym-tetrachloroethane (60/40 parts by weight) at 25° C.

The viscosity number (J) of the pure polyether ester amides and the pure polyether amides was determined with solutions of 0.5 g of product at 25° C. in 100 ml of m-cresol (DIN 53 727).

Notched impact strength according to DIN 53 453.
Flexural stress at break according to DIN 53 452.
Modulus of elasticity (tensile test) according to DIN 53 457/2.1.
Deflection temperature under load according to ISO/R 75 (procedures A and B).
Melt Index (MFI) according to DIN 735.

The examples denoted by letters are not in accordance with the invention.

In a tumbler dryer having a capacity of 0.5 m³, 120 kg of the synthetic resin mixture in the form of granules (composition see Tables 1A, 1B, 1C and 1D) is subjected to a thermal treatment under the conditions indicated in said Tables.

The characteristic properties of the molding compositions are represented in Tables 2A, 2B, 2C, 2D and 3A, 3B, 3C and 3D.

A—EXAMPLES WITH ACRYLATE GRAFT COPOLYMER

TABLE 1A

| Experiment | Synthetic Resin Mixture [parts by weight] | Conditions of Thermal Treatment Temp. [°C.] | Time [h] | N₂ Stream [l/h] |
|---|---|---|---|---|
| 1 | 90 PBTP* (J = 90 cc/g) 10 Acrylate Graft Copolymer I** | 200 | 4 | 80 |
| 2 | 85 PBTP* (J = 90 cc/g) 15 Acrylate Graft Copolymer I** | 190 | 5 | 80 |
| 3 | 85 PBTP* (J = 90 cc/g) 15 Acrylate Graft Copolymer II*** | 190 | 3 | 120 |
| A | 100 PBTP* (J = 90 cc/g) | 210 | 4 | 100 |
| B | 100 PBTP* (J = 90 cc/g) | 190 | 8 | 120 |
| C | 90 PBTP* (J = 110 cc/g) 10 Acrylate Graft Copolymer I** | — | — | — |
| D | 85 PBTP* (J = 116 cc/g) 15 Acrylate Graft Copolymer II*** | — | — | — |

*Polybutylene terephthalate - viscosity number prior to blending
** Two-stage graft copolymer of 88 parts by weight of butyl acrylate/12 parts by weight of methyl methacrylate
***Two-stage graft copolymer of 69 parts by weight of butyl acrylate/31 parts by weight of methyl methacrylate

TABLE 2A

| Experiment | Modulus of Elasticity (Tensile Test) [N/mm²] | Flexural Stress at Break [N/mm²] | Deflection Temperature under Load [°C.] | |
|---|---|---|---|---|
| | | | Procedure A | Procedure B |
| 1 | 2,200 | 83 | 66 | 160 |
| 2 | 2,050 | 78 | 64 | 155 |
| 3 | 2,100 | 81 | 68 | 158 |

TABLE 3A

| Experiment | Viscosity Number (J)* of PBTP Proportion in Synthetic Resin Mixture [cc/g] | | Notched Impact Strength [kJ/m²] | | |
|---|---|---|---|---|---|
| | Before Thermal Treatment | After Thermal Treatment | Before Thermal Treatment 23° C. | After Thermal Treatment 23° C. | After Thermal Treatment −20° C. |
| 1 | 88 | 105 | 14.1 | 41.7 | 11.2 |
| 2 | 86 | 110 | 20.9 | 53.9 | 11.7 |
| 3 | 87 | 108 | 11.3 | 35.1 | 9.8 |
| A | 90 | 105 | 3.5 | 3.7 | 3.5 |

TABLE 3A-continued

| Experiment | Viscosity Number (J)* of PBTP Proportion in Synthetic Resin Mixture [cc/g] | | Notched Impact Strength [kJ/m²] | | |
|---|---|---|---|---|---|
| | Before Thermal Treatment | After Thermal Treatment | Before Thermal Treatment 23° C. | After Thermal Treatment 23° C. | After Thermal Treatment −20° C. |
| B | 90 | 112 | 3.5 | 3.8 | 3.5 |
| C | 106 | —** | 17.6 | —** | — |
| D | 110 | —** | 13.5 | —** | — |

*Measured on PBTP extracted from the synthetic resin mixture
**No thermal treatment

B—EXAMPLES WITH ALPHA OLEFIN COPOLYMERS

TABLE 1B

| Experiment | Synthetic Resin Mixture [parts by weight] | Conditions of Thermal Treatment | | |
|---|---|---|---|---|
| | | Temp. [°C.] | Time [h] | N₂ Stream [l/h] |
| 1 | 90 PBTP¹ (J = 90 cc/g) 10 Ethylene/Vinyl Acetate Copolymer² | 190 | 4 | 70 |
| 2 | 85 PBTP¹ (J = 90 cc/g) 15 Ethylene/Vinyl Acetate Copolymer² | 185 | 5 | 80 |
| 3 | 80 PBTP¹ (J = 90 cc/g) 20 Ethylene/Butyl Acrylate Copolymer³ | 195 | 3 | 100 |
| 4 | 90 PBTP¹ (J = 90 cc/g) 10 Ethylene/Butyl Acrylate Copolymer⁴ | 190 | 4 | 80 |
| A | 100 PBTP¹ (J = 90 cc/g) | 210 | 4 | 100 |
| B | 100 PBTP¹ (J = 90 cc/g) | 190 | 8 | 120 |
| C | 85 PBTP¹ (J = 109 cc/g) 15 Ethylene/Vinyl Acetate Copolymer² | — | — | — |
| D | 80 PBTP¹ (J = 117 cc/g) 20 Ethylene/Butyl Acrylate Copolymer³ | — | — | — |

Explanations for Table 1, see next page

TABLE 2B

| Experiment | Modulus of Elasticity (Tensile Test) [N/mm²] | Flexural Stress at Break [N/mm²] | Deflection Temperature under Load [°C.] | |
|---|---|---|---|---|
| | | | Procedure A | Procedure B |
| 1 | 2,100 | 79 | 65 | 161 |
| 2 | 1,950 | 75 | 61 | 153 |
| 3 | 2,250 | 83 | 66 | 164 |
| 4 | 2,000 | 81 | 63 | 159 |

TABLE 3B

| Experiment | Viscosity Number (J)* of PBTP Proportion in Synthetic Resin Mixture [cc/g] | | Notched Impact Strength [kJ/m²] | | |
|---|---|---|---|---|---|
| | Before Thermal Treatment | After Thermal Treatment | Before Thermal Treatment 23° C. | After Thermal Treatment 23° C. | After Thermal Treatment −20° C. |
| 1 | 89 | 103 | 6.5 | 35.2 | 9.7 |
| 2 | 88 | 105 | 9.7 | 50.5 | 11.1 |
| 3 | 88 | 108 | 3.8 | 20.8 | 8.2 |
| 4 | 87 | 106 | 8.6 | 42.2 | 12.3 |
| A | 90 | 105 | 3.5 | 3.7 | 3.5 |
| B | 90 | 112 | 3.5 | 3.8 | 3.5 |
| C | 105** | —*** | 10.9 | —*** | — |
| D | 111** | —*** | 4.0 | —*** | — |

*Measured on PBTP extracted from synthetic resin mixture
**Viscosity number of total mixture
***No thermal treatment

C—EXAMPLES WITH POLYETHER ESTER AMIDES

TABLE 1C

| Experiment | Synthetic Resin Mixture [parts by weight] | Conditions of Thermal Treatment | | |
|---|---|---|---|---|
| | | Temp. [°C.] | Time [h] | N₂ Stream [l/h] |
| 1 | 90 PBTP¹ (J = 90 cc/g) 10 PAE² containing 30% by wt. LL³ 70% by wt. PTHF⁴DDA⁵ (equimolar; J = 160 cc/g) | 205 | 4 | 100 |
| 2 | 85 PBTP¹ (J = 90 cc/g) 15 PAE² (composition according to Exp. 1) | 200 | 3 | 120 |
| 3 | 80 PBTP¹ (J = 90 cc/g) 20 PAE² containing 50% by wt. LL³ 50% by wt. PTHF⁴/DDA⁵ (equimolar; J = 155 cc/g) | 195 | 5 | 80 |
| 4 | 85 PBTP¹ (J = 90 cc/g) 15 PAE² containing 25% by wt. LL³ 75% by wt. PTHF⁴TA⁶ (equimolar; J = 157 cc/g) | 190 | 6 | 100 |
| A | 100 PBTP¹ (J = 90 cc/g) | 210 | 4 | 100 |
| B | 100 PBTP¹ (J = 95 cc/g) | 200 | 10 | 150 |
| C | 90 PBTP¹ (J = 107 cc/g) 10 PAE² (composition according to Exp. 3) | — | — | — |
| D | 80 PBTP¹ (J = 104 cc/g) 20 PAE² (composition according to Exp. 1) | — | — | — |

¹PBTP: Polybutylene terephthalate - viscosity number prior to blending
²PAE: Polyether ester amide
³LL: Laurolactam
⁴PTHF: Polytetrahydrofurandiol (molecular weight 1,000 - number average)
⁵DDA: Dodecanedioic acid
⁶TA: Terephthalic acid

TABLE 2C

| Experiment | Modulus of Elasticity (Tensile Test) [N/mm²] | Flexural Stress at Break [N/mm²] | Deflection Temperature under Load [°C.] | |
|---|---|---|---|---|
| | | | Procedure A | Procedure B |
| 1 | 2,100 | 81 | 65 | 156 |
| 2 | 2,000 | 77 | 62 | 152 |
| 3 | 1,870 | 75 | 59 | 148 |
| 4 | 1,750 | 71 | 57 | 146 |

TABLE 3C

| Experiment | Viscosity Number (J) of Synthetic Resin Mixture [cc/g] | | Notched Impact Strength [kJ/m²] | | |
|---|---|---|---|---|---|
| | Before Thermal Treatment | After Thermal Treatment | Before Thermal Treatment 23° C. | After Thermal Treatment 23° C. | After Thermal Treatment −20° C. |
| 1 | 92 | 113 | 5.2 | 21.3 | 11.1 |

TABLE 3C-continued

| | Viscosity Number (J) of Synthetic Resin Mixture [cc/g] | | Notched Impact Strength [kJ/m²] | | |
|---|---|---|---|---|---|
| | | | Before Thermal Treatment | After Thermal Treatment | |
| Experiment | Before Thermal Treatment | After Thermal Treatment | 23° C. | 23° C. | −20° C. |
| 2 | 98 | 109 | 8.1 | 28.8 | 17.5 |
| 3 | 102 | 117 | 10.4 | 37.3 | 21.1 |
| 4 | 96 | 106 | 12.7 | 45.0 | 23.1 |
| A | 90 | 105 | 3.5 | 3.5 | 3.5 |
| B | 95 | 132 | 3.5 | 4.2 | 3.5 |
| C | 110 | —* | 7.6 | —* | — |
| D | 107 | —* | 14.2 | —* | — |

*No thermal treatment

D—EXAMPLES WITH POLYETHER AMIDES

TABLE 1D

| Experiment | Synthetic Resin Mixture [parts by weight] | Conditions of Thermal Treatment | | |
|---|---|---|---|---|
| | | Temp. [°C.] | Time [h] | N₂ Stream [l/h] |
| 1 | 85 PBTP¹ (J = 90 cc/g) 15 PEA² containing 30% by wt. LL³ 70% by wt. PTHF⁴/DDA⁵ (equimolar; J = 155 cc/g) | 200 | 3 | 100 |
| 2 | 80 PBTP¹ (J = 90 cc/g) 20 PEA² containing 36% by wt. LL³ 64% by wt. PTHF⁴DDA⁵ (equimolar; J = 165 cc/g) | 190 | 4 | 120 |
| 3 | 80 PBTP¹ (J = 90 cc/g) 20 PEA² containing 40% by wt. LL³ 60% by wt. PTHF⁴/DDA⁵ (equimolar; J = 160 cc/g) | 195 | 4 | 85 |
| A | 100 PBTP¹ (J = 90 cc/g) | 200 | 4 | 85 |
| B | 85 PBTP¹ (J = 106 cc/g) 15 PEA² containing 30% by wt. LL³ 70% by wt. PTHF⁴DDA⁵ (equimolar; J = 155 cc/g) | — | — | — |

¹PBTP: Polybutylene terephthalate - viscosity number prior to blending
²PEA: Polyether amide
³LL: Laurolactam
⁴PTHF: Polytetrahydrofurandiol (molecular weight 750 - number average)
⁵DDA: Dodecanedioic acid

TABLE 2D

| Experiment | Modulus of Elasticity (Tensile Test) [N/mm²] | Flexural Stress at Break [N/mm²] | Deflection Temperature under Load [°C.] | |
|---|---|---|---|---|
| | | | Procedure A | Procedure B |
| 1 | 1,950 | 78 | 63 | 155 |
| 2 | 1,910 | 76 | 61 | 151 |
| 3 | 1,870 | 73 | 60 | 149 |
| A | 2,400 | 88 | 70 | 170 |
| B | 1,950 | 78 | 64 | 157 |

TABLE 3D

| | Viscosity Number (J) of Synthetic Resin Mixture [cc/g] | | Notched Impact Strength [kJ/m²] | | |
|---|---|---|---|---|---|
| | | | Before Thermal Treatment | After Thermal Treatment | |
| Experiment | Before Thermal Treatment | After Thermal Treatment | 23° C. | 23° C. | −20° C. |
| 1 | 93 | 111 | 11.6 | 39.7 | 20.7 |
| 2 | 95 | 108 | 10.9 | 36.5 | 18.9 |
| 3 | 92 | 110 | 8.8 | 34.7 | 17.7 |
| A | 90 | 112 | 3.5 | 4.2 | 3.6 |
| B | 109 | —* | 12.2 | —* | —* |

*No thermal treatment

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for substantially increasing the impact strength of molding compositions of a synthetic resin mixture containing predominantly a polyalkylene terephthalate with a minor amount of an impact strength modifier, the synthetic resin mixture containing:
    A. 70–95% or 60–97% by weight of a polyethylene terephthalate, polypropylene terephthalate or polybutylene terephthalate having a viscosity number (J) of about 55–100 cc/g and
    B. when A is 70–95%, 5–30% by weight of an elasticizing acrylate graft copolymer, an α-olefin copolymer or polyether amide, or when A is 60–97%, 3–40% of a polyether ester amide, the latter being obtained by condensation of at least one omega-aminocarboxylic acid or lactam of at least 10 carbon atoms with a polyalkylene glycol having a number average molecular weight of 400–6,000 and at least one dicarboxylic acid,
    said process comprising maintaining the synthetic resin mixture in the solid form at temperatures of 15°–60° C. below the melting point of the pure component A in an inert gas atmosphere for a time sufficient to effect recondensation of the synthetic resin mixture and to achieve a substantially higher impact strength than the non-recondensed synthetic resin mixture.

2. Molding compositions, as produced by the process of claim 1.

3. An article of manufacture formed from a molding composition according to claim 2.

4. A process according to claim 1 wherein (A) is present in a concentration of 60–97% and (B) is 3–40% of a polyether ester amide.

5. A molding composition as produced by the process of claim 4.

6. An article of manufacture formed from a molding composition according to claim 5.

7. A process according to claim 4 wherein the polyether ester amide is obtained by condensation of:
    (1) at least one member selected from the group consisting of omega-amino carboxylic acids and lactams of at least 10 carbon atoms,
    (2) a polyalkylene glycol having a number average molecular weight of 400–6,000, and
    (3) at least one dicarboxylic acid,
    the weight ratio of (1) to the sum of (2) and (3) is in a range of 20:80 to 50:50 and the hydroxy and carboxy groups of (2) and (3) are present in approximately equivalent proportions.

8. A molding composition as produced by the process of claim 7.

9. An article of manufacture formed from a molding composition according to claim 8.

10. A process according to claim 7 wherein (A) is laurolactam, (B) is polytetrahydrofurandiol having a number average molecular weight of 650–2,000, and (C) is dodecanedioic acid, the number average molecular weight of the resultant polyether ester amide being 5,000–20,000.

11. A molding composition as produced by the process of claim 10.

12. An article of manufacture formed from a molding composition according to claim 11.

13. A process according to claim 1, wherein components A and B are melt-blended prior to the recondensation step.

14. A molding composition, as produced by the process of claim 13.

15. An article of manufacture formed from a molding composition according to claim 14.

16. A process according to claim 4, wherein components A and B are melt-blended prior to the recondensation step.

17. A molding composition, as produced by the process of claim 5.

18. An article of manufacture formed from a molding composition according to claim 6.

19. A process according to claim 1, wherein said polyalkylene terephthalate is polybutylene terephthalate.

20. A molding composition according to claim 2, wherein the polyalkylene terephthalate is polybutylene terephthalate.

21. An article of manufacture according to claim 3, wherein the polyalkylene terephthalate is polybutylene terephthalate.

22. A process according to claim 4, wherein said polyalkylene terephthalate is polybutylene terephthalate.

23. A molding composition according to claim 5, wherein the polyalkylene terephthalate is polybutylene terephthalate.

24. An article of manufacture according to claim 6, wherein the polyalkylene terephthalate is polybutylene terephthalate.

25. A process according to claim 7, wherein said polyalkylene terephthalate is polybutylene terephthalate.

26. A molding composition according to claim 8, wherein the polyalkylene terephthalate is polybutylene terephthalate.

27. An article of manufacture according to claim 9, wherein the polyalkylene terephthalate is polybutylene terephthalate.

28. A process according to claim 10, wherein said polyalkylene terephthalate is polybutylene terephthalate.

29. A molding composition according to claim 11, wherein the polyalkylene terephthalate is polybutylene terephthalate.

30. An article of manufacture according to claim 12, wherein the polyalkylene terephthalate is polybutylene terephthalate.

31. A process according to claim 13, wherein said polyalkylene terephthalate is polybutylene terephthalate.

32. A molding composition according to claim 14, wherein the polyalkylene terephthalate is polybutylene terephthalate.

33. An article of manufacture according to claim 15, wherein the polyalkylene terephthalate is polybutylene terephthalate.

34. A process according to claim 16, wherein said polyalkylene terephthalate is polybutylene terephthalate.

35. A molding composition according to claim 17, wherein the polyalkylene terephthalate is polybutylene terephthalate.

36. An article of manufacture according to claim 18, wherein the polyalkylene terephthalate is polybutylene terephthalate.

37. An article of manufacture according to claim 15, wherein component A is polybutylene terephthalate, said article of manufacture having a minimum notched impact strength at $-20°$ C. of 11.1.

38. An article of manufacture according to claim 15, wherein component A is polybutylene terephthalate, said article of manufacture having a minimum notched impact strength at $-20°$ C. of 17.5.

39. An article of manufacture according to claim 24, wherein component A is polybutylene terephthalate, said article of manufacture having a minimum notched impact strength at $-20°$ C. of 11.1.

40. An article of manufacture according to claim 24, wherein component A is polybutylene terephthalate, said article of manufacture having a minimum notched impact strength at $-20°$ C. of 17.5.

41. A molding composition according to claim 20, said molding composition being capable of yielding articles having notched impact strengths of at least 11.1 at $-20°$ C.

42. A molding composition according to claim 20, said molding composition being capable of yielding articles having notched impact strengths of at least 17.5 at $-20°$ C.

43. A molding composition according to claim 14, wherein component A is polybutylene terephthalate and the molding composition is capable of yielding articles having a notched impact strength of at least 11.1 at $-20°$ C.

44. A molding composition according to claim 14, wherein component A is polybutylene terephthalate and the molding composition is capable of yielding articles having a notched impact strength of at least 17.5 at $-20°$ C.

45. A process according to claim 1, wherein the impact strength is increased by at least 250% at 23° C.

* * * * *